April 10, 1951  W. W. GILL  2,548,600
TOOL JOINT
Filed April 29, 1948
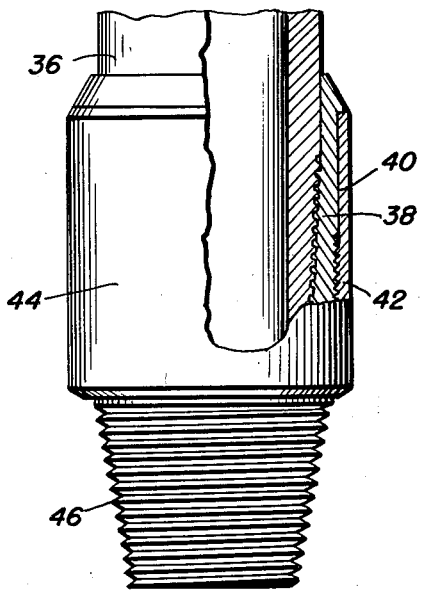
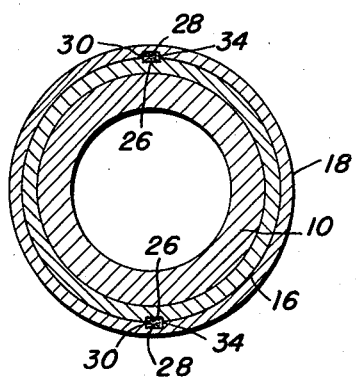
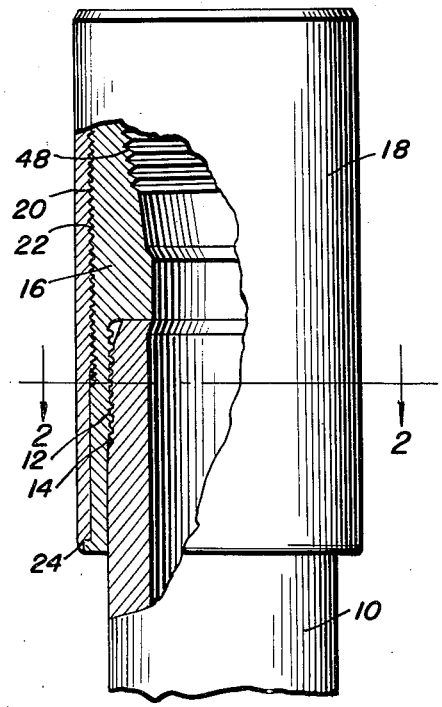
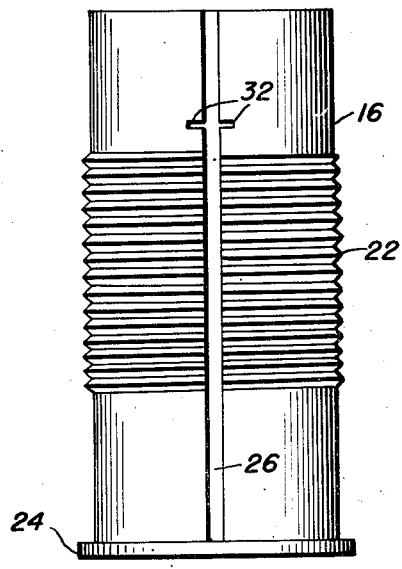
Walter W. Gill
INVENTOR.
BY Clarence A. O'Brien
and Harvey B. Jacobson
Attorneys Patented Apr. 10, 1951

2,548,600

UNITED STATES PATENT OFFICE 2,548,600

TOOL JOINT

Walter W. Gill, Riverton, Wyo.

Application April 29, 1948, Serial No. 24,032

2 Claims. (Cl. 308—4)

1

This invention relates to new and useful improvements and structural refinements in tool joints, more specifically, joints or couplings for connecting together sections of tubular drilling tools for oil wells, and the like, and the principal object of the invention is to enable such joints or couplings to better withstand the wear to which they are subjected when in use.

In conventional practice, the joints or couplings simply assume the form of internally screw threaded sleeves intended to receive externally screw threaded portions at the ends of the tubular sections, and when the connected tool sections bend or spring while rotating in the bore of the well, the joints are subjected to considerable rubbing against the walls of the bore. A similar condition presents itself when the tool sections are straight but the bore of the well is crooked.

It is, as aforesaid, the primary object of the invention to enable the joints to better withstand this wear, which object is achieved by providing the couplings with protecting sleeves.

An important feature of the invention resides in the provision of means for locking the protecting sleeves on the couplings so as to prevent relative rotation of the couplings with respect to the sleeves, after the joints are assembled.

Another feature of the invention resides in the provision of a tool joint which is simple in construction, which may be quickly and easily assembled or dismantled, and the components of which will readily lend themselves to economical manufacture.

With the above more important objects and features in view and such other objects and features as may become apparent as this specification proceeds, the invention consists essentially of the arrangement and construction of parts as illustrated in the accompanying drawing, in which:

Figure 1 is an elevational view of a joint embodying the invention, the same being shown in association with a section of the drilling tool and being partially broken away to reveal its construction.

Figure 2 is a cross sectional view, taken substantially in the plane of the line 2—2 of Figure 1;

Figure 3 is an elevational view of a coupling used in the invention; and

Figure 4 is an elevational view, partially broken away, showing the invention embodied in a joint on a further drill section which is to be connected to that illustrated in Figure 1.

2

Like characters of reference are employed to designate like parts in the specification and throughout the several views.

Referring now to the accompanying drawings in detail, more particularly to Figures 1, 2 and 3, the reference character 10 designates a section of a drilling tool which is provided at one end thereof with an externally screw threaded portion 12, which is engageable with an internally screw threaded portion 14 formed in a substantially tubular coupling 16.

The coupling 16 is protected from wear by means of a sleeve 18 which is internally screw threaded as at 20 so as to engage an externally screw threaded portion 22 with which the coupling 16 is formed.

It is to be noted that the coupling 16 is also equipped at one end thereof with an outturned flange 24 against which one end of the sleeve 18 may be tightened, and the outer surface of the coupling 16 as well as the inner surface of the sleeve 18 are formed with longitudinally extending grooves 26, 28, respectively, which grooves are registrable, one with the other, when the sleeve is tightened on the coupling, so as to provide what may be referred to as elongated recesses 30.

When the joint is to be assembled, the portion 12 of the section 10 is simply threaded into the portion 14 of the coupling 16, whereupon the sleeve 18 is threaded onto the coupling and tightened against the flange 24 in such a position that the grooves 26, 28 are in register and provide the recesses 30. Thereafter, solidifiable liquid material such as lead or babbitt is poured into the recesses 30 and is permitted to set, resulting in the formation of what may be referred to as locking keys in the recesses. By virtue of the locking keys the undesired loosening of the coupling 16 in the sleeve 18 will be prevented, and it is to be noted that while the sleeve 18 was being tightened on the coupling 16, the coupling 16 was simultaneously tightened on the threaded portion 12 of the section 10.

It may be added that the coupling 16 (as well as the sleeve 18) may be provided intermediately the length of the grooves 26, 28 respectively, with transversely extending slots or bays 32, into which the solidifiable liquid material poured into the recesses 30 may flow and, after solidifying will prevent the locking keys (indicated at 34) from sliding outwardly from their recesses.

Referring now to the accompanying Figure 4, the same illustrates a further tubular section 36 of the drilling tool, which is to be coupled to the aforementioned section 10, the section 36 being screw threaded as at 38 into a coupling 40 which, in turn, is screw threaded as at 42 into a connecting sleeve 44, as will be clearly understood. A flange similar to the aforementioned flange 24 and locking keys retaining recesses similar to the aforementioned recesses 30 are provided for preventing relative rotation of the sleeve 44 with respect to the coupling 40, and the latter is equipped with an externally screw threaded portion 46 receivable in an internally screw threaded portion 48 formed in the aforementioned coupling 16. In this manner, the couplings 40, 16 as well as the sections 36, 10 may be firmly and securely connected together.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. In a tool joint, the combination of a tubular coupling having a screw-threaded outer surface provided with a longitudinally extending groove and with a bay extending laterally from said groove, an internally screw-threaded sleeve positioned on said coupling and having its inner surface provided with a longitudinally extending groove and with a bay extending laterally from the last-mentioned groove, the groove and bay of said sleeve being registerable with the respective groove and bay of said coupling, and a filler of fusible material provided in the registering grooves and bays for locking said sleeve and said coupling against relative rotation.

2. In a tool joint, the combination of a tubular coupling provided at one end thereof with an outturned annular flange and having a screw-threaded outer surface provided with a longitudinally extending groove and with a bay extending laterally from said groove, an internally screw-threaded sleeve positioned on said coupling in abutment with said flange and having its inner surface provided with a longitudinally extending groove and with a bay extending laterally from said last-mentioned groove, the groove and bay of said sleeve being registerable with the respective groove and bay of said coupling to provide an elongated recess having an open pouring end and closed at its remaining end by said flange, and a filler of fusible material provided in said recess for locking said sleeve and said coupling against relative rotation.

WALTER W. GILL.

REFERENCES CITED

The following references are of record in the file of this patent:

UNITED STATES PATENTS

| Number | Name | Date |
|---|---|---|
| 819,040 | Chroninger | May 1, 1906 |
| 1,455,971 | Rickenbacker et al. | May 22, 1923 |
| 2,247,173 | Huntsinger | June 24, 1941 |
| 2,301,495 | Abegg | Nov. 10, 1942 |
| 2,336,974 | Abegg | Dec. 14, 1943 |
| 2,440,441 | Hanes | Apr. 27, 1948 |